United States Patent [19]

Gutshall

[11] 3,837,212
[45] Sept. 24, 1974

[54] METHOD AND APPARATUS FOR MAKING A THREADED FASTENER WITH CAPTIVE CLAMPING MEANS

[75] Inventor: Charles E. Gutshall, Schaumburg, Ill.

[73] Assignee: Elco Industries, Inc., Rockford, Ill.

[22] Filed: July 2, 1973

[21] Appl. No.: 375,707

Related U.S. Application Data

[62] Division of Ser. No. 222,532, Feb. 1, 1972, abandoned.

[52] U.S. Cl. .................. 72/469, 10/10 R, 10/155 A
[51] Int. Cl. ...................... B21d 17/04, B23p 19/08
[58] Field of Search ........ 10/10 R, 2, 155 A; 72/88, 72/90, 469

[56] References Cited
UNITED STATES PATENTS

| | | | |
|---|---|---|---|
| 2,283,494 | 5/1942 | Erdman | 10/155 A |
| 2,303,224 | 11/1942 | Olson | 10/10 R |
| 2,391,308 | 12/1945 | Hanneman | 151/32 |
| 3,204,442 | 9/1965 | Wieber | 72/469 |
| 3,217,530 | 11/1965 | Sato | 72/469 |
| 3,654,800 | 4/1972 | Yankee | 72/469 |

Primary Examiner—Charles W. Lanham
Assistant Examiner—E. M. Combs
Attorney, Agent, or Firm—Neuman, Williams, Anderson & Olson

[57] ABSTRACT

A fastener having an apertured clamping means on its shank and an annular retaining means therefor is fabricated by assembling the apertured clamping means on the shank adjacent the head and thereafter forming an annular collar by an improved technique whereby the surface of the collar adjacent the clamping means is disposed substantially perpendicular to the axis of the shank. The improved technique includes the steps of subjecting a peripheral segment of the shank, while the shank is rotating and having threads rolled on other portions thereof, to metal-forming radial pressure and progressively expanding the segment axially towards the assembled clamping means so as to form a progressively widening annular groove in the shank while rotationally swaging the metal transferred from the groove into the desired annular collar. For such purposes a roll thread die is provided having thread-forming surfaces and a slot for a die insert containing a groove-forming face and related surfaces which spin the metal transferred from the groove into the annular collar on the shank.

5 Claims, 16 Drawing Figures

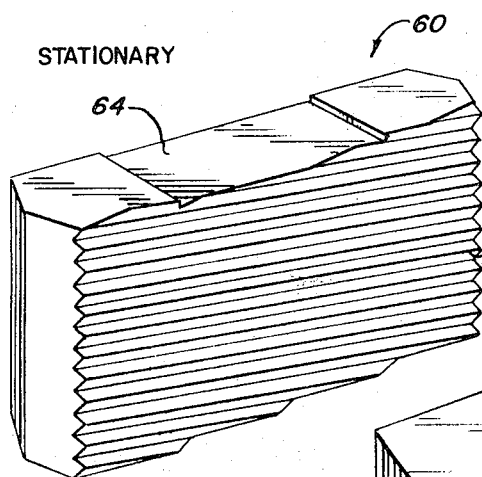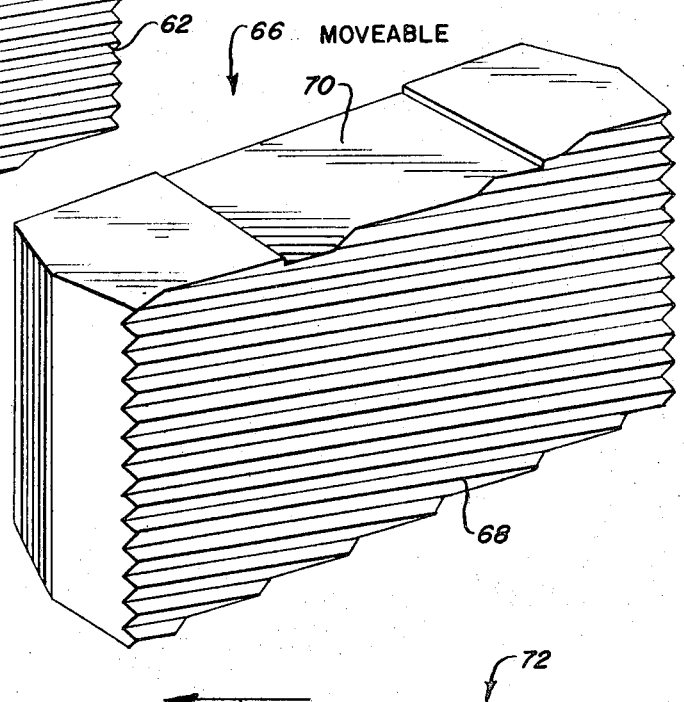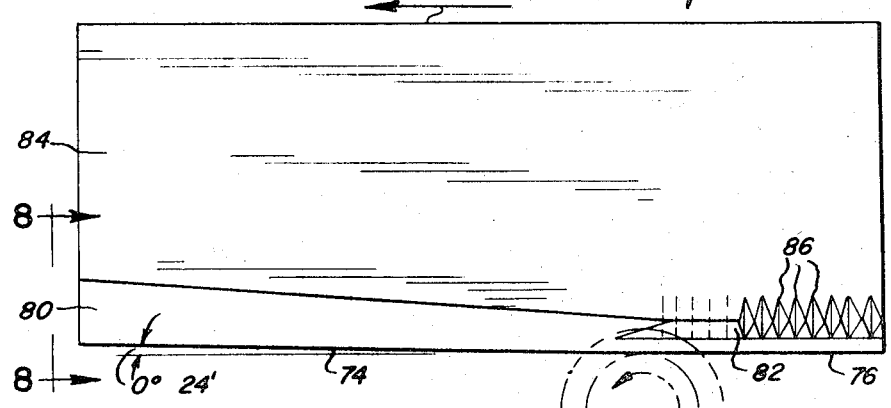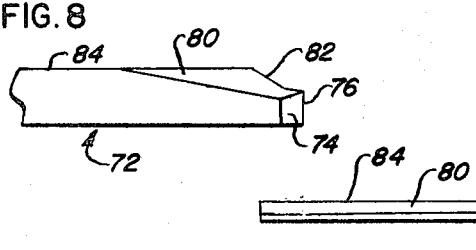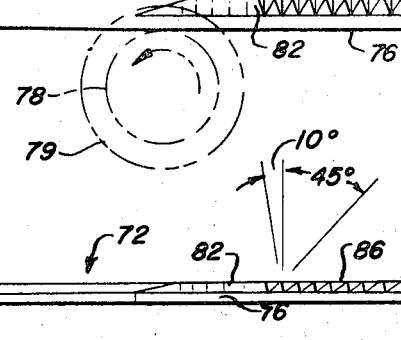

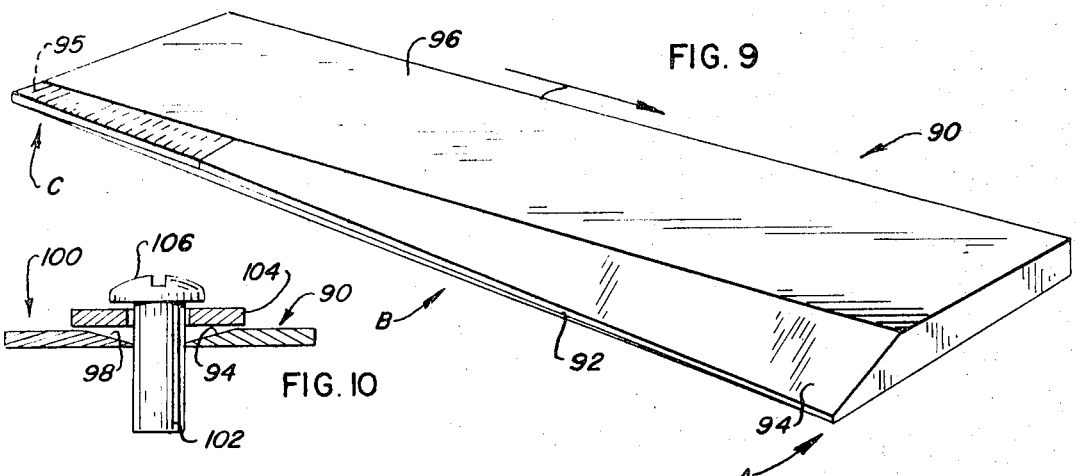
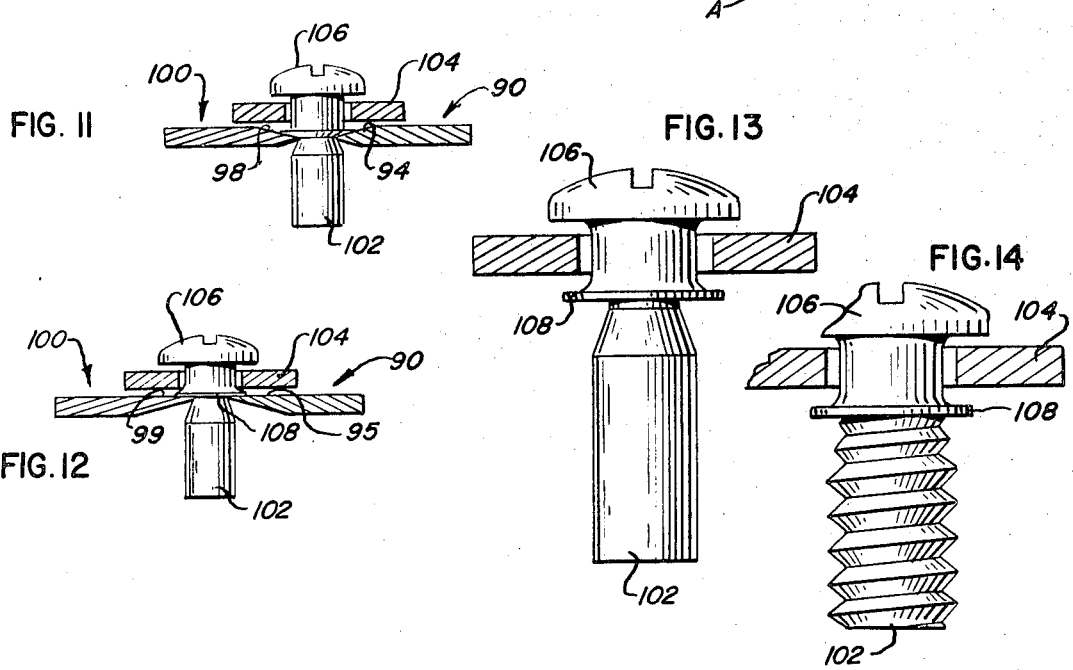
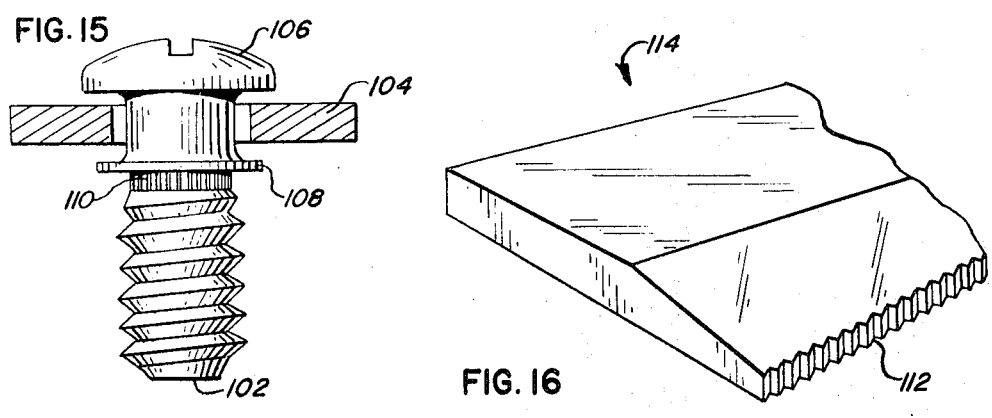

3,837,212

METHOD AND APPARATUS FOR MAKING A THREADED FASTENER WITH CAPTIVE CLAMPING MEANS

This is a division, of application Ser. No. 222,532 filed Feb. 1, 1972, now abandoned.

BACKGROUND OF THE INVENTION

1. Field of the Invention

This invention relates to threaded fasteners having captive clamping means retained on the shank adjacent the head by means of an integral annular shoulder or ring. More specifically, it relates to an improved method and apparatus for the low-cost fabrication of annular shoulders on the shanks of fasteners to retain clamps, washers, or the like thereon without sacrificing the strength thereof.

While the present invention will be described with particular reference to electrical conductor terminal clamps which are retained on threaded shanks by an annular shoulder formed by the method and apparatus of the present invention, it should be understood that the invention is not limited thereto. The concepts set forth herein can be readily adapted for the fabrication of annular rings, collars or shoulders on various types of cylindrical shanks for retaining a variety of apertured devices thereon, as those skilled in the art will recognize in the light of the present disclosure.

2. Description of the Prior Art

The art relating to terminal clamps for electrical connectors is highly developed because there has long existed a need for connecting electrical wires, cables, and other leads either to one another or to terminal posts. Typical of some of the prior art in this field are U.S. Pat. Nos. 2,151,674, 2,304,711, 2,946,039, 3,050,706 and 3,509,517.

Some of the prior art terminal clamps have been specifically designed to have the versatility of accommodating a plurality of electrical wires having different diameters but approximately equal clamping loads. Various approaches are employed to assure adequate clamping of each wire, including, for example, clamping plates which teeter or tip relative to the shank axis. To permit such teetering, the aperture in the plate may be oversized or, at least, elongated in a direction generally perpendicular to the axis of the wires being accommodated. Prior art relating to terminal clamps for accommodating wires of different size includes, for example, U.S. Pat. Nos. 3,081,507, 3,177,456, 3,178,675, 3,191,140, 3,238,495, and 3,509,521.

Another problem which the prior art has attempted to solve is the inconvenience and cost of assembling the clamping devices on the threaded fasteners at the job site, particularly when the terminal clamps are very small in size. A related problem arises when removing or unclamping the terminal clamp to temporarily release, remove or replace the wires. The clamping plate may fall off the shank or even stick or otherwise remain attached to the wires which were clamped thereby.

To cope with these problems, terminal clamps have been fabricated with retaining shoulders or rings integrally formed on the shank itself. These retain the clamping plates on the shank so that the electrician has a preassembled device available for use. In addition, the shoulder positively lifts the plates from the wires as the shank is unthreaded. Prior art devices employing shoulders on the threaded shanks, although not necessarily for retaining terminal clamps, include, for example, U.S. Pat. Nos. 2,192,322, 3,141,722, 3,205,473, 3,372,366, and 3,398,393. These and similar devices, however, also have problems associated therewith.

Some of the prior art devices are costly to produce, particularly if, for example, the annular collars or rings are machined thereon. Even ignoring the cost of the machining operation, there are the scrap losses. Other prior art techniques result in a point or area of weakness in the threaded shank. Some are limited as to the size of the collar which can be formed thereon, thus limiting the size of the aperture in the clamping plate and the amount of teetering inherent in the design. In some devices the amount of metal forming or metal transfer is excessive, resulting in a requirement for high metal-forming forces or the slowing down of the metal-forming operation.

Still another problem with certain prior art devices arises from the angular disposition of the contacting collar surface relative to the aperture in the clamping plate. If the contacting surface is wedge-shaped and the clamping plate remains imbedded in, or otherwise sticks to, the clamped wires when the fastener is unthreaded to remove the plate, the upper surface of the retaining ring wedges itself into the aperture of the clamping plate. Thus, it is not loose on the shank and perforce rotates with the shank. This may lead to problems including the difficulty of aligning the plate with the wires when reclamping them.

These and other problems associated with prior art devices are pointed up in connection with the objects of this invention, as now set forth.

OBJECTS OF THE INVENTION

It is therefore a general object of the present invention to provide a low-cost method and apparatus for fabricating a threaded fastening device having a captive clamp thereon. It is another general object to provide a method and apparatus for fabricating a fastening device having a clamping means thereon which is retained by an annular shoulder. It is another general object to provide a one-step method and associated apparatus whereby such annular shoulder may be formed as part of the thread-rolling operation employing a conventional roll-thread machine.

It is another general object to provide a method and apparatus for producing a terminal clamp which accommodates different wire sizes simultaneously and has enhanced teetering characteristics. It is another general object to provide a method and apparatus for producing a captive terminal clamp fastener having an integral retaining collar formed thereon which does not weaken the shank and yet produces a large-sized coller with a minimum transfer of metal.

It is a specific object to provide a method and apparatus for producing retaining rings on terminal clamps without machining the metal or producing scrap, which ring positively lifts the clamping plate without becoming wedged into the aperture thereof.

It is another specific object to provide a method and apparatus for producing annular collars on cylindrical shanks employing less force and reduced transfer of metal. It is another specific object to produce an annular collar on a threaded shank in a conventional thread-rolling operation without unduly interfering with the thread-forming function. It is another specific object to provide an apparatus for rolling annular shoulders on cylindrical shanks wherein enhanced lubrication is provided during the metal-forming operation.

It is still another specific object to provide a method and apparatus for rolling and spinning a shoulder on a cylindrical shank to produce a shoulder having a surface substantially perpendicular to the shank axis. It is still another specific object to provide a method and apparatus for producing annular retaining rings or collars having anti-wedge characteristics.

These and other objects of the present invention will become apparent as a detailed description thereof proceeds.

SUMMARY OF THE INVENTION

These objects are achieved by a method which includes the steps of providing an apertured clamping means such as a clamping plate or washer and an unthreaded shank having a head at one extremity. The shank is inserted through the aperture of the clamping means in a conventional manner so as to be disposed adjacent the head and in the proper position for formation of the retaining collar.

A peripheral segment of the shank axially spaced from the clamping means on the shank side thereof is then subjected to metal-forming radial pressure while the shank is rotating, so as to form an annular groove therein. The segment is progressively expanded axially towards the clamping means whereby the annular groove is progressively widened and the metal transferred from the groove is rotationally swaged into an annular collar having a surface adjacent the clamping means substantially perpendicular to the axis of the shank. This process is continued until the outer diameter of the collar at least exceeds the minimum cross section of the aperture in the clamping means.

A continuous thread is also formed on at least a portion of the shank between the annular collar and the other or entering end extremity of the shank. In a preferred method, the steps of forming the annular collar and the threads are carried out substantially simultaneously as part of a single rolling operation. The minimum diameter of the groove in the shank is equal to, or preferably greater than, the root diameter of the threaded portion.

The above method is preferably carried out by rolling the shank between a single set of opposed dies. For such purposes, a novel roll thread and annular ring die are employed which can be accommodated in a conventional roll thread machine. The opposed stationary and moving dies each comprise in combination a roll thread die blank having a thread-forming configuration on the exposed die surface and a slot on an adjacent surface communicating with the exposed die surface. The slot accommodates a die insert which is securable in fixed relationship to the die blank in a roll thread machine.

The exposed die surface of the insert is substantially coextensive with the exposed die surface of the blank in the same sense as shown in the prior art, e.g., U.S. Pat. Nos. 2,284,659, 3,429,161 and 3,602,026. It differs, however, in that it has a groove-forming face thereon disposed to form a groove in the shank of a workpiece as it is simultaneously threaded by the die blank. The groove-forming face is located adjacent an inner portion of the insert and has an outer edge which progressively approaches an outer portion of the insert while progressively extending in a shank-axis direction. The adjacent outer side surface of the die insert is disposed to spin the metal transferred from the shank groove into an annular ring on the shank.

As will become apparent from the drawings, the adjacent outer side surface of the die insert is preferably beveled, at least along a portion thereof, so as to work the metal of the annular ring into the desired configuration. In a preferred embodiment, at least a portion of the beveled surface is serrated whereby to provide higher metal forming pressures for a given force and also a repository for metal-forming lubricants.

In particular embodiments the threads may be rolled into the annular groove. Alternatively or in addition, the groove may have axially-aligned strengthening ribs. The latter are preferably formed by corresponding conformations on the faces of the die inserts.

BRIEF DESCRIPTION OF THE DRAWINGS

The present invention will be more clearly understood from the following detailed description of specific embodiments read in conjunction with the accompanying drawings, wherein:

FIGS. 4 and 5 are perspective views of stationary and movable die blanks, respectively, having slots therein to accommodate die inserts of the present invention;

FIG. 6 is an overhead plan view of one embodiment of a die insert of the present invention, only a portion of the serrations on the beveled surface being shown, a fastener shank being depicted in dashed lines to suggest the rolling operation;

FIG. 7 is a front elevation view of the die insert of FIG. 6;

FIG. 8 is a fragmentary side view on an enlarged scale taken along the line 8—8 of FIG. 6;

FIG. 9 is a perspective view of another embodiment of a die insert of the present invention;

FIGS. 10, 11 and 12 are elevation views, partly in section, illustrating the progressive formation of the groove and annular collar on a headed shank using die inserts of the type illustrated in FIG. 9, the formation of the thread convolutions on the shank being omitted for clarity of illustration;

FIG. 13 is an elevation view, partly in section, on an enlarged scale of the terminal clamp fabricated as illustrated in FIGS. 10–12, the thread convolutions again being omitted for clarity of illustration;

FIG. 14 is similar to FIG. 13 except that the thread convolutions on the shank are shown;

FIG. 15 is similar to FIG. 14 and illustrates another embodiment wherein a portion of the annular groove has a strength-imparting ribbed configuration; and FIG. 16 is a fragmentary perspective view of a die insert having a rib-forming configuration on the groove-forming face thereof to form strength-imparting ribs, such as are illustrated in the embodiment of FIG. 15.

It should be understood that the drawings are not necessarily to scale and that the embodiments are sometimes illustrated by graphic symbols, diagrammatic representations and fragmentary views. In certain instances, details which are not necessary for an understanding of the present invention or which render other details difficult to perceive have been omitted, e.g., some of the serrations on the beveled surface of die inserts, the thread convolutions on the shanks, etc.

No effort has been made to portray a roll thread machine in which the apparatus of the present invention is advantageously employed. Such machines are well known to those skilled in the art and would merely burden this specification. It should be understood, of course, that the invention is not necessarily limited to the particular embodiments illustrated herein.

DETAILED DESCRIPTION OF THE DRAWINGS, INCLUDING PREFERRED EMBODIMENTS

Figure 1:
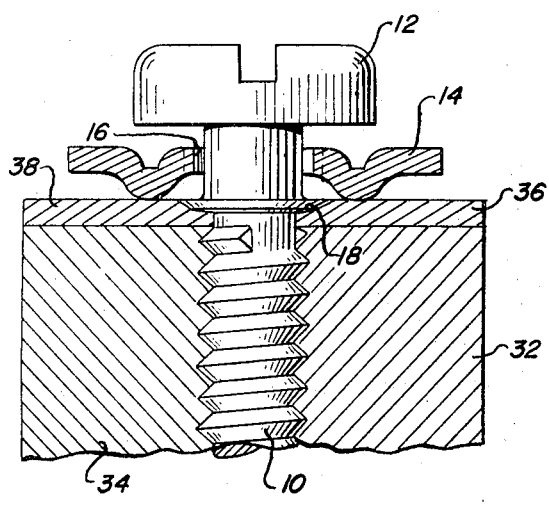
FIG. 1 is a fragmentary elevation view, partly in section, of a terminal clamp as it is fabricated by the method and apparatus of the present invention.

Referring to FIG. 1, the terminal clamp comprises shank 10 having threads thereon and a slotted head 12 at one extremity. Clamping plate 14 is assembled on an unthreaded portion of shank 10 by means of aperture 16. While not apparent in FIG. 1, aperture 16 may be circular or oblong or other non-circular configurations to enhance its teetering characteristics, that is, its ability to tilt to accommodate a pair of wires of different diameters.

Clamping plate 14 is retained on shank 10 by annular collar or ring 18. A particular feature of ring 18 is that it is formed by the method and apparatus of the present invention from a minimum amount of metal which is spun or rotatively swaged from shank 10 and deflected or folded upwardly to form an axially thin but a relatively large outer diameter collar. As a result, aperture 16 in clamping plate 14 may have a larger diameter for enhanced teetering characteristics, as illustrated by the dashed lines in FIG. 1, and still be retained by collar 18.

Another feature of annular collar 18 is the fact that the surface adjacent retaining plate 14 is substantially perpendicular to the axis of the shank. This contrasts with annular collar 22 on shank 24 of the prior art terminal clamp illustrated in FIG. 2.

Figure 2:
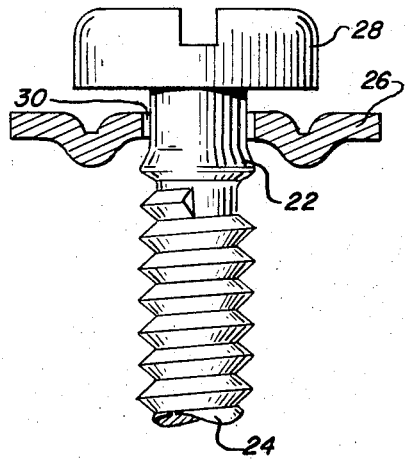
FIG. 2 is a fragmentary elevation view, partly in section, of a prior art terminal clamp for comparison with that of FIG. 1.

Retaining plate 26 adjacent head 28 in FIG. 2 is similar to retaining plate 14 of FIG. 1. The diameter of the aperture 30 therein is restricted by the smaller diameter of annular retaining ring 22. The amount of metal forming annular ring 22, however, may actually exceed that forming annular ring 18 of larger diameter in FIG. 1. The average axial dimension of annular ring 22 substantially exceeds that of ring 18, whereby ring 22 does not protrude as much radially. Thus, as contrasted with the prior art device of FIG. 2, the method and apparatus of the present invention produces a larger-diameter retaining ring with the same or, more usually, less metal transferred from the adjacent groove in the shank.

Quite aside from the difference in diameters, the upper surface of collar or ring 22, which is adjacent plate 26, is disposed at an acute angle, e.g., about 20° to 40°, relative to the axis of the shank. Thus, when unthreading or backing out the terminal clamp of FIG. 2, the collar has a tendency to wedge itself into aperture 30 so as to become jammed therein, with attendant disadvantages. In contrast, as already indicated, the substantially flat surface of ring 18 in FIG. 1, which is disposed at about 45° to 90° relative to the axis, cannot wedge itself into aperture 16 but, instead, positively lifts plate 14 without any binding or jamming when the terminal clamp is unthreaded or backed out to remove or change wires.

Again referring to FIG. 1, the threads and collar 18 on shank 10 are formed by means of a pair of roll thread dies 32 and 34 having slots therein to accommodate a pair of corresponding die inserts 36 and 38, respectively. Die blanks 32 and 34 with inserts 36 and 38 are configured so as to fit and be clamped into a conventional roll thread machine, whereby the operation of forming the threads and retaining collar is carried out in the same manner as a simple threading operation. Die blanks and die inserts similar to blank 32 and insert 36 of FIG. 1 are described in detail in connection with FIGS. 3–8.

Figure 3:
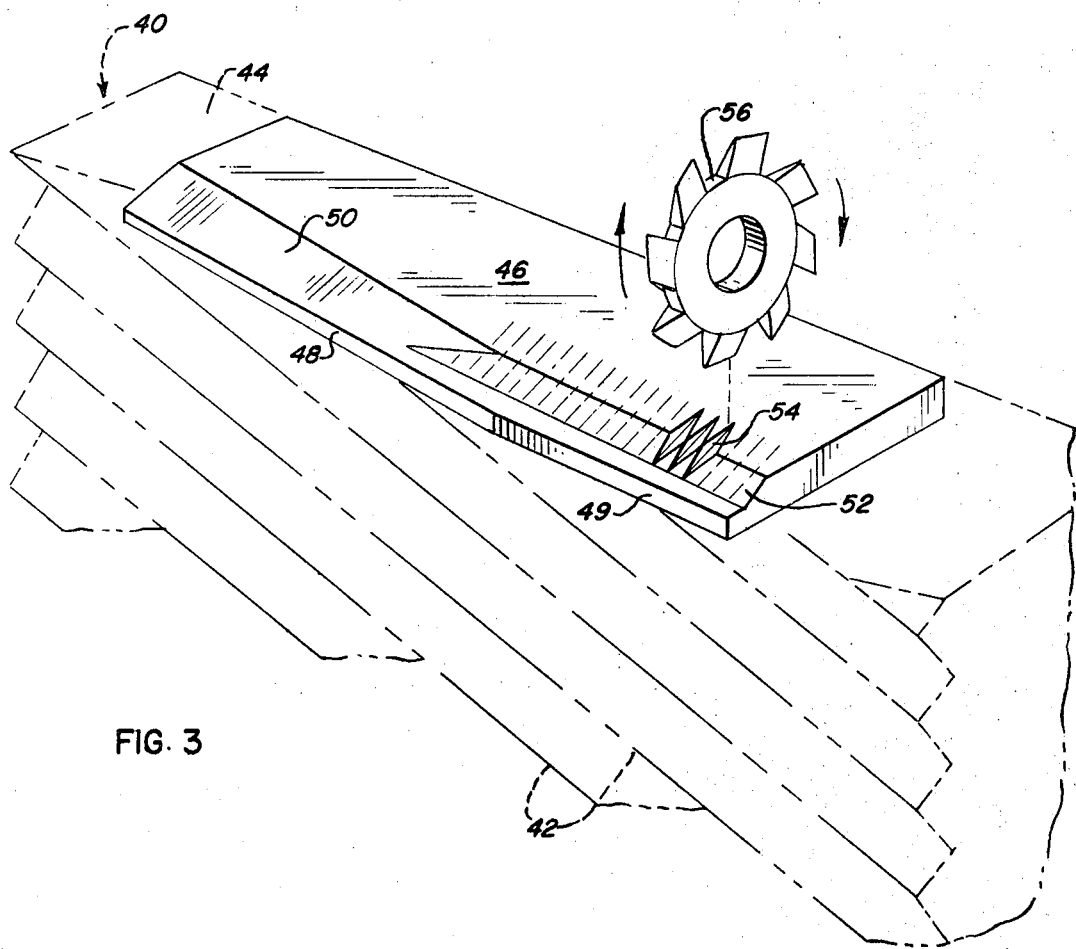
FIG. 3 is a fragmentary perspective view of a roll thread die blank (in dashed lines) and the die insert of the present invention (in solid lines), a cutter also being diagrammatically shown to illustrate how the optional serrations may be cut into the beveled surfaces.

Referring to FIG. 3, roll thread die blank 40, having a plurality of thread-forming grooves 42 on the exposed die surface, has a slot located intermediate the ends of the upper surface 44 thereof. This slot accommodates die insert 46 which has exposed die surfaces 48 and 49 substantially coextensive with the exposed die surface of die blank 40. The upper surface of die insert 46 has beveled portions 50 and 52 which are configured, in conjunction with die surfaces 48 and 49, to form the annular collar on the shank in the desired configuration.

Serrations 54 are preferably present in beveled surface 52 and adjacent surfaces and may be cut therein by means of cutter 56. These serrations reduce overloading problems and otherwise enhance the ability of the die to form the annular collar from the metal rotatively swaged from the shank. In addition to lessening the possibility of slowing down or stopping the roll thread function, the resulting knurled-like surface also provides a reservoir for a metal-forming lubricant.

The structure and function of the roll thread and annular ring die of FIG. 3 are best illustrated by reference to FIGS. 4–8. In FIG. 4, stationary die blank 60 has thread-forming grooves 62 on the exposed die surface thereof and a slot 64 on the upper surface to accommodate a die insert. Die blank 60 otherwise has a conventional configuration for use in a roll thread machine of conventional design.

Movable die blank 66 having thread-forming grooves 68 on the face thereof and a die insert slot 70 is correspondingly configured. In a roll thread machine, the groove-forming faces of the die blanks are facing each other with the shank of the terminal clamp disposed between for the thread rolling and collar forming operation. The die inserts in each case are securely held in the respective slots by the same clamping means of the roll-thread machine which holds the die blanks themselves.

The die insert 72 shown in FIGS. 6, 7 and 8 is configured for use in the slot of movable die blank 66 of FIG. 5. The die insert for stationary die 60 of FIG. 4 is similar to that of FIGS. 6, 7 and 8 except that it is slightly shorter in length and other adjustments are made, as those skilled in the art will recognize in the light of this disclosure.

Die insert 72 has exposed die surfaces 74 and 76, which progressively contact and form the groove in the shank of the terminal clamp, the circumference of the groove being represented by dashed circle 78 and the resulting retaining collar being represented by dashed circle 79. Die surface 74 progressively extends into the inter-die space from the left side as viewed in FIGS. 6 and 7 until the break point where face 76 commences. The height or thickness of the die face 74 as viewed in FIG. 7 also progressively increases from the left-hand side to the break point, whereby the groove formed in the shank is progressively deepened and heightened simultaneously so that the metal displaced therefrom is spun upwardly.

The transferred metal is rotatably swaged or spun and folded upwardly to form the annular collar by means of the wedge-shaped surfaces 80 and 82. Surface 82 and the adjacent portion of surface 84 preferably have a plurality of serrations 86 therein for the same purposes as previously discussed in connection with FIG. 3.

In a specific embodiment, for purposes of illustration, die insert 72 has a length of 1.805 inches, which would fit into a 1.810-inch slot of movable die blank 66 (FIG. 5). This contrasts with a die insert measuring 1.545 inches which would fit into a 1.550-inch slot of stationary die 60 (FIG. 4). The length of surface 74 is 1.29 inches, and the length of surface 76 is 0.515 inch. The edge-to-edge width at the left side of die insert 72 is 0.812 inch, which progressively increases to a width of 0.815 inch at the break point where surface 76 commences and the width then remains constant. The height of die face 74 at the left-hand edge is approximately 0.020 inch. This height progressively increases to 0.030 inch, which is the height of die face 76. The total height of the die insert is 0.037 inch.

Beveled surface 80 is disposed at an angle of about 10° from the plane of surface 84; and beveled surface 82 is disposed at an angle of about 30°, also relative to surface 84. The adjacent edge of beveled surface 82 is displaced 0.013 inch from the plane of surface 76 and the remote edge is displaced 0.023 inch from the plane of surface 76. The plane of surface 74 is disposed at an angle of 0° 24' relative to the plane of surface 76, as indicated in FIG. 6. Certain angular relations of the serrations or knurls 86 are indicated in FIG. 7.

In FIG. 9, alternative die insert 90, which would move in a direction opposite to that of FIGS. 3 and 6–8, comprises die face 92 and beveled surface 94 and knurled surface 95 on upper surface 96. While die face 92 progressively projects further into the inter-die space along at least a portion of its length in the same manner as die face 48 of FIG. 3 and die face 74 of FIGS. 6–8, the thickness or height thereof does not change. Instead, die face 92 is disposed in a substantially diagonal direction, whereby the die face progressively moves both radially inwardly and axially upwardly in relation to the shank of the terminal clamp being processed. The metal thus rotatively swaged from the shank is spun into the desired collar configuration by beveled surface 94 and serrated surface 95 of die insert 90 and the corresponding surface 98 and 99 on the opposed die insert 100 depicted in FIGS. 10–12.

FIGS. 10–12 show the metal-forming operation occurring approximately at points A, B and C, respectively, on die insert 90 of FIG. 9 and the corresponding points on die insert 100, the respective die blanks being omitted for simplicity of illustration. As shank 102 is progressively rolled between die inserts 90 and 100, a generally frustoconical annular groove is formed in the shank adjacent retaining plate 104 on the side or face opposite head 106. The depth of the groove is controlled so that the minimum shank diameter is no less than the root diameter of the threads (not shown) and preferably greater than the root diameter. Thus, the groove does not introduce into shank 102 a plane or segment of reduced strength relative to the strength of the threaded shank.

The metal displaced from the groove is progressively spun or built into retaining collar 108 by beveled surfaces 94 and 98 and knurled surfaces 95 and 99. As previously indicated, the resulting collar 108 is axially thin whereby a larger retaining collar is obtained with the same or less volume of displaced metal than in prior art techniques. Also, the surface adjacent the retaining plate 104 is substantially perpendicular to the shank axis whereby no wedging or jamming problems are encountered. This is apparent in the magnified version of FIG. 13.

As an alternative to the discontinued thread of the embodiment of FIG. 1, the thread depicted on shank 102 in FIG. 13 is extended well into the groove and up to the undersurface of collar 108. This is accomplished by continuing the thread rolling grooves on the die blank "downstream" from the die insert. While the major diameter of the threaded portion of the groove is smaller than on the remainder of the shank, the additional threaded portion affords considerable holding power.

Still another embodiment is depicted in FIG. 15 wherein strength-imparting ribs 110 are formed in the groove. This permits the displacement of a greater volume of metal for a given shank strength or a greater shank strength for a given volume of displaced metal. The ribs or undulating surface may be imparted by configuring the die face correspondingly, as suggested by the serrated surface 112 on the die insert 114 of FIG. 16.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A roll-thread and annular-ring die for manufacturing externally threaded shanks having a retaining ring adjacent one extremity thereof, comprising in combination:

a. a roll thread die blank having a thread-forming configuration angularly disposed on an exposed die surface thereof relative to the normal direction of travel of said die, the direction of travel of said die being generally normal to the axis of the shanks being processed therein, and a slot on an adjacent side communicating with said exposed die surface;

b. a die insert in said slot and securable in fixed relationship to said die blank in a roll thread machine and having an exposed die surface substantially coextensive with the exposed die surface of said blank, the die surface of said die insert having a face thereon with a longitudinal groove-forming surface of progressively-increasing height in a transverse shank direction and disposed to form a groove in the shank of a workpiece as it is simultaneously threaded by the die blank, said groove-forming face being located adjacent an inner portion of said insert and having an outer edge progressively extending away from the inner portion in a shank-axis direction as the groove-forming surface increases in height so that the groove-forming surface is angularly disposed relative to the normal direction of travel of said die blank and opposite to that of said thread-forming configuration, at least a portion of the adjacent outer surface of the die insert being beveled to spin the metal transferred from the shank groove into an annular ring on the shank.

2. The roll-thread and annular-ring die of claim 1 wherein at least a portion of the beveled surface is serrated.

3. The roll-thread and annular-ring die of claim 1 wherein the groove-forming face is substantially uniform in width and disposed diagonally relative to the exposed die surface.

4. The roll-thread and annular-ring die of claim 1 wherein the groove-forming face expands in width along the exposed die surface.

5. The roll-thread and annular-ring die of claim 1 wherein at least a portion of the groove-forming face has a non-regular conformation whereby axially-aligned strengthening protrusions are imparted to the groove surface.

* * * * *

UNITED STATES PATENT OFFICE
CERTIFICATE OF CORRECTION

Patent No. 3,837,212                    Dated September 24, 1974

Inventor(s) Charles E. Gutshall

It is certified that error appears in the above-identified patent and that said Letters Patent are hereby corrected as shown below:

Address on title page is shown as "Schaumburg, Ill." and should read --2911 East State Street, Rockford, Illinois 61108--;

Column 2, line 54, change "coller" to --collar--;

Column 7, line 59, change "surface" to --surfaces--.

Signed and sealed this 17th day of December 1974.

(SEAL)
Attest:

McCOY M. GIBSON JR.                C. MARSHALL DANN
Attesting Officer                  Commissioner of Patents